(12) United States Patent
Tucek

(10) Patent No.: US 8,904,092 B2
(45) Date of Patent: Dec. 2, 2014

(54) IDENTIFYING A LOCATION CONTAINING INVALID DATA IN A STORAGE MEDIA

(75) Inventor: Joseph A. Tucek, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 13/383,641

(22) PCT Filed: Feb. 10, 2010

(86) PCT No.: PCT/US2010/023708
§ 371 (c)(1),
(2), (4) Date: Jan. 12, 2012

(87) PCT Pub. No.: WO2011/099963
PCT Pub. Date: Aug. 18, 2011

(65) Prior Publication Data
US 2012/0303868 A1    Nov. 29, 2012

(51) Int. Cl.
*G06F 12/02* (2006.01)
*G06F 12/10* (2006.01)

(52) U.S. Cl.
CPC .... *G06F 12/0246* (2013.01); *G06F 2212/7201* (2013.01); *G06F 12/0238* (2013.01); *G06F 2212/7209* (2013.01); *G06F 12/10* (2013.01); *G06F 2212/7205* (2013.01)
USPC .......................................... 711/103; 711/206

(58) Field of Classification Search
USPC ................................................ 711/103, 206
See application file for complete search history.

(56) References Cited

U.S. PATENT DOCUMENTS

| 2005/0226033 | A1  | 10/2005 | Moriyama et al. |
| 2009/0193219 | A1* | 7/2009  | Ohira et al. ................... 711/170 |
| 2009/0222613 | A1* | 9/2009  | Kurashige ..................... 711/103 |
| 2010/0023682 | A1  | 1/2010  | Lee et al. |
| 2010/0169553 | A1  | 7/2010  | Yano et al. |
| 2011/0202709 | A1* | 8/2011  | Rychlik ........................ 711/103 |

FOREIGN PATENT DOCUMENTS

JP           2007011929         1/2007

OTHER PUBLICATIONS

EMC2, David L. Black, Fred Knight; (Where Information Lives); "TRIM: Behavior of Subsequent Reads"; NetApp; Sep. 2008; (11 pages).
Mendel Rosenblum et al., Electrical Engineering and Computer Sciences, Computer Science Division, University of California, Berkeley, CA; The Design and Implementation of a Log-Structured File System; Jul. 24, 1991; (15 pages).
ST., AN1821, Application Note; Garbage Collection in Single Level Cell NAND Flash Memories; Oct. 2004; (6 pages).
Nitin Agrawal, Microsoft Research, University of Wisconsin-Madison, Silicon Valley, CA; "Design Tradeoffs for SSD Performance" to appear in proceedings of the USENIX Technical Conference; Jun. 2008; (14 pages).

(Continued)

*Primary Examiner* — Jared Rutz

(57) ABSTRACT

A system includes storage media and control logic coupled to the storage media, where the control logic is configured to receive a write request and determine whether the write request specifies writing a predetermined pattern to a particular location of the storage media. In response to determining that the write request specifies writing the predetermined pattern to the particular location, the control logic is configured to identify with an indicator that the particular location contains invalid data.

20 Claims, 3 Drawing Sheets

(56) References Cited

OTHER PUBLICATIONS

T13/1699, Revision 4a; Technical Editor: Curtis E. Stevens, Western Digital Technologies, Inc.; Working Draft Project, American National Standard; Information Technology—AT Attachment 8-ATA/ATAPI Command Set (ATA8-ACS); Lake Forest, CA. 9230; May 21, 2007; (462 pages).

Frank Shu/Nathan Obr, Microsoft Corporation; "Data Set Management Commands Proposal for ATA8-ACS2," T13/e07154r3, Revision 3; Redmond Washington; Oct. 5, 2007; (9 pages).

Fred Knight, Curtis E. Stevens; T13/e08137r4, Revision 4; Deterministic TRIM Proposal for ATA8-ACS2; Lake Forest, CA.; Dec. 17, 2008; (4 pages).

Fred Knight, Curtis E. Stevens; T13/e09158r1, Revision 1;"TRIM—DRAT / RZAT clarifications for ATA8-ACS2," Lake Forest CA.; Dec. 14, 2009; (6 pages).

Corsair Memory Inc., Frequently Asked Questions, "USB Flash Wear-Leveling and Life Span"; Jun. 2007; (2 pages).

LWN.net, Contributions by Valerie Aurora (Henson); "Log-structured file systems: There's one in every SSD"; Sep. 18, 2009; (18 pages).

Margo Seltzer—Harvard University, Keith Bostic—University of California, Berkeley, Marshall Kirk McKusick—University of California, Berkeley, Carl Staelin—Hewlett-Packard Laboratories; An Implementation of a Log-Structured File System for UNIX, Abstract; 1993 Winter USENiX, San Diego, CA, Jan. 25-29, 1993; (18 pages).

Korean Intellectual Property Office, International Appl. No. PCT/US2010/023708; Written Opinion and Search Report dated Oct. 18, 2010; (10 pages).

Milo Polte, Jiri Simsa, Garth Gibson, Carnegie Mellon University,School of Computer Science; "Enabling Enterprise Solid State Disks Performance"; Pittsburgh, PA; 2009; (7 pages).

Micron Technology Inc., TN-29-42: "Wear-Leveling Techniques in NAND Flash Devices," Introduction; 2008; (8 pages).

Wenguang Wang, Yanping Zhao, Rick Bunt, Department of Computer Science, University of Saskatchewan; "HyLog: A High Performance Approach to Managing Disk Layout"; Saskatoon, SK S7N 5A9, Canada; Mar. 2004; (14 pages).

\* cited by examiner

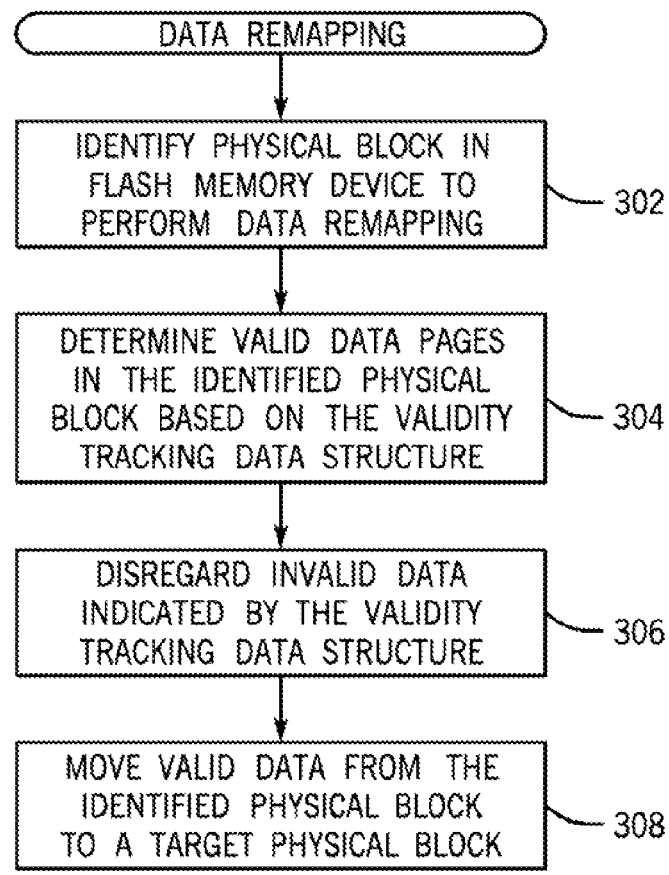
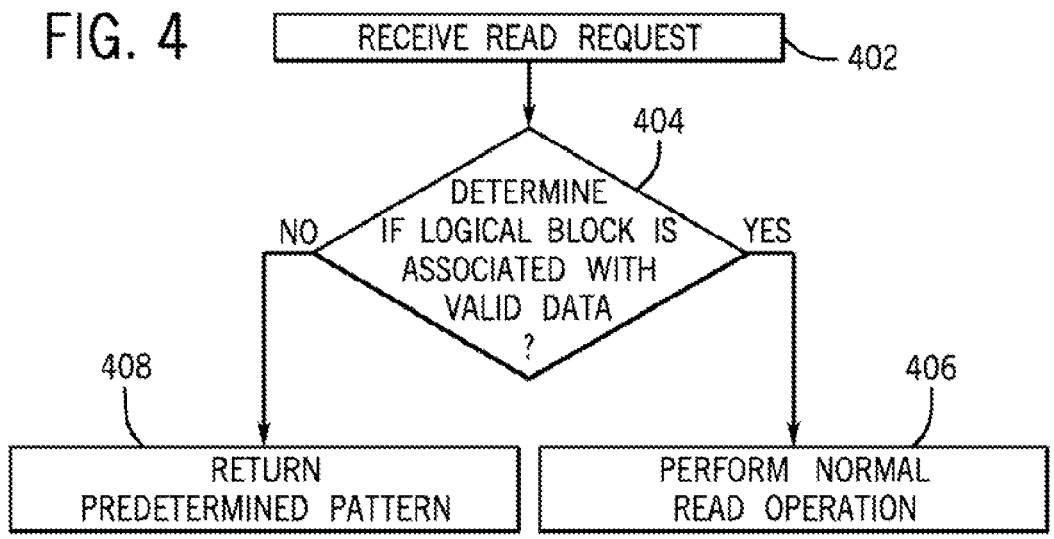

IDENTIFYING A LOCATION CONTAINING INVALID DATA IN A STORAGE MEDIA

CROSS-REFERENCE TO RELATED APPLICATION

This application is a national stage application under 35 U.S.C. §371 of PCT/US10/23708, filed Feb. 10, 2010.

BACKGROUND

Various types of storage devices are widely used, including disk-based storage devices (e.g., magnetic or optical disk drives) and semiconductor-based storage devices. Examples of semiconductor-based storage devices include dynamic random access memories (DRAMs), static random access memories (SRAMs), and flash memories.

BRIEF DESCRIPTION OF THE DRAWINGS

Some embodiments of the invention are described with respect to the following figures:

FIG. 3 is a flow diagram of a process of performing data remapping according to further embodiments; and FIG. 4 is a flow diagram of a process of performing a read according to some embodiments.

DETAILED DESCRIPTION

Figure 1:
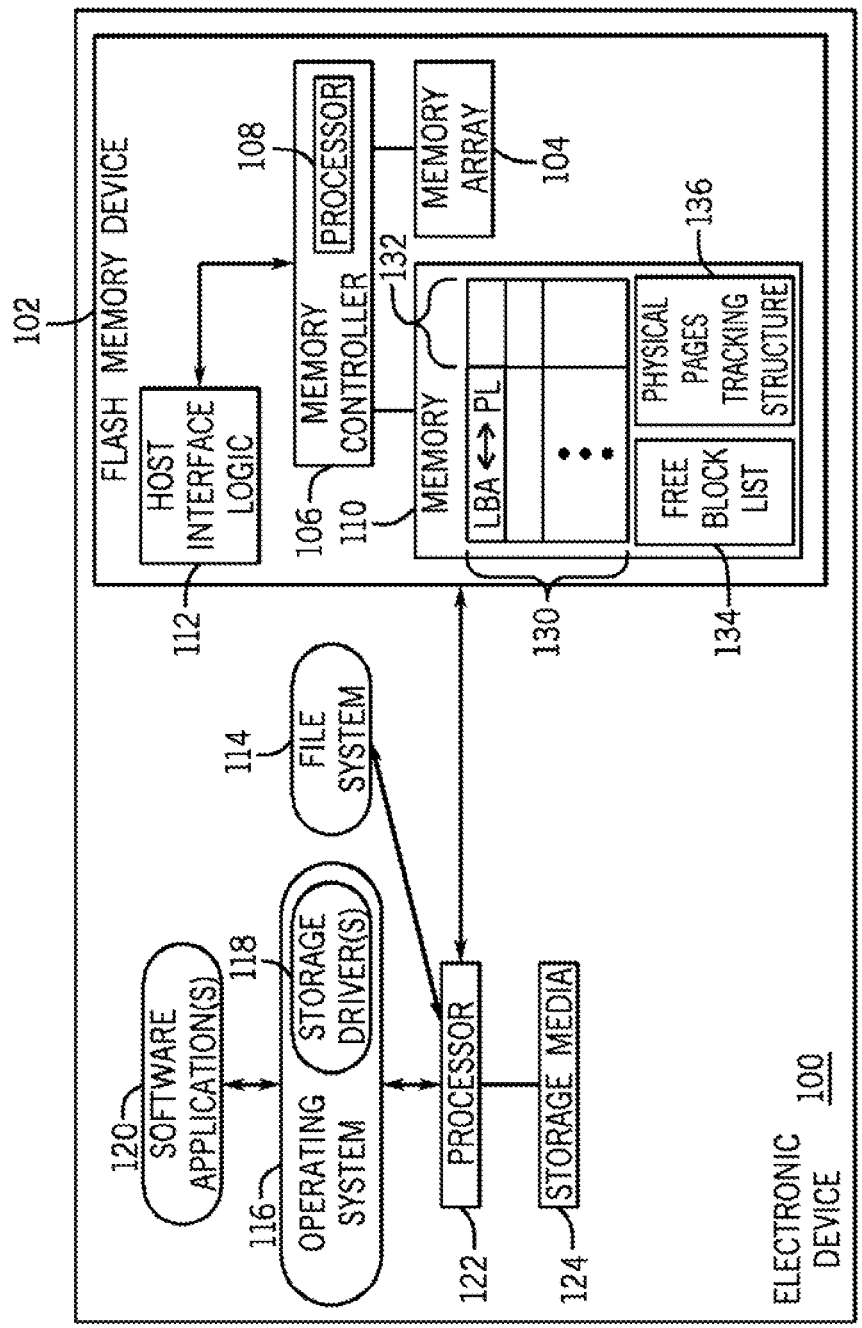
FIG. 1 is a block diagram of an example system incorporating an embodiment of the invention.

Improvements in flash memory technology have resulted in more widespread use of flash memories for non-volatile storage. A flash memory device is a form of electrically erasable and programmable read-only memory (EEPROM), and is made up of an array of memory cells. A flash memory device is non-volatile, in that the flash memory device is able to maintain information stored in the flash memory device even if power is removed from the flash memory device. Furthermore, since a flash memory device is a semiconductor-based memory, it has faster access speeds than disk-based storage devices such as magnetic or optical disk drives. In some implementations, the memory cells of the flash memory device include floating gate transistors for storing data bits using floating gates of such floating gate transistors.

Although a flash memory device can be read or programmed in small increments (e.g., a byte or a word for NOR flash, a page for NAND flash) using random access, the flash memory device is typically erased a block at a time, where a block can be a relatively large collection of memory cells. In some implementations, a flash memory device is arranged into multiple blocks, where each block is made up of many words or pages. Once data is written to a block of the flash memory device, the block has to be first erased before it can be rewritten with new data. In this discussion, the smallest unit that may be written is referred to as a "page", which refers to some predefined collection of storage bits in the flash memory device. A "block" refers to a larger predefined collection of storage bits, where the block is the smallest unit that can be erased, and where a block can include multiple pages. More generally, a "location" of the flash memory device can refer to any one of a block, page, or other storage portions.

Generally, a "flash memory device" refers to any memory device that provides non-volatile storage of data and in which locations of such memory device are first erased before performing rewrites of the locations. Although reference is made to "flash memory device" in various embodiments discussed, it is noted that techniques or mechanisms according to some embodiments are also applicable for use with other types of storage devices. Other examples of non-volatile storage include memristor-based storage or phase-change memory.

To update the contents of one physical page in a flash memory device involves erasing all of the other physical pages in that block. Erasing a whole block and rewriting it to update one page is typically slow, and incurs unnecessary writes to floating gates holding unmodified data. Performing unnecessary writes is referred to as write amplification. To avoid write amplification and the associated performance penalty, flash memory devices typically do not update physical pages in place, but instead maintain a mapping from logical pages to physical pages. When a logical page is updated, it is written to an erased page in a different block and the mapping is updated correspondingly. The old physical page is considered "garbage", and will at some future time be erased. Generally, write performance of a flash memory device is more efficient if there is a relatively larger percentage of erased physical pages in the flash memory device. However, with relatively high space utilization, the cost of writes can increase dramatically. For example, the cost of write operations can double when physical space utilization of the flash memory device moves from 80% to 90%.

A logical block may be larger than or smaller than a physical block of the flash memory device. Alternatively, a logical block may be larger than or smaller than a page of the flash memory device (although an alternative design may involve the page being larger than the logical block). The specific mapping between logical blocks and physical storage locations of the flash memory device depends on the specific implementation.

To achieve higher flash memory device performance, flash memory device manufacturers may incorporate additional spare blocks into the flash memory device (where the additional spare blocks provide more physical storage capacity than what is actually advertised for the flash memory device). However, providing additional spare blocks comes at the expense of increased overall cost of the flash memory device (increased cost per bit of storage). On the other hand, to achieve reduced cost per bit, conventional flash memory designs may sacrifice write performance when utilization of the flash memory device is high.

In a flash memory device, it is desirable to provide wear leveling and garbage collection (or cleaning). Wear leveling attempts to distribute data writes evenly across the various blocks of the flash memory device to decrease the overall total wear of the flash memory device, such that the overall lifetime of the flash memory device can be increased. Any particular location of a flash memory device can wear out after some number (e.g., 100,000 to one million or more) erase operations are performed with respect to the location. To avoid excessive overuse of any particular physical block of the flash memory device, a wear leveling algorithm is typically employed by the flash memory device, which attempts to evenly distribute erase operations to the blocks of the flash memory device over the lifetime of the flash memory device.

Garbage collection (or cleaning) is performed to move pages of data from source blocks to target blocks, such that the source blocks can be erased for subsequent write operations to be performed. The flash memory device tracks which physical pages contain invalid data to be erased, which physical pages contain valid data that have corresponding logical pages that map to the corresponding physical pages containing valid data, and which physical pages are erased and available to be written to. If there are no physical pages that have been erased and available to be written to, and all blocks of the flash memory device are partially occupied with physical pages containing valid data, then further write operations may not be possible until one or more of the blocks of the flash memory device are erased. Hence garbage collection will coalesce physical pages containing valid data such that there are blocks containing only invalid pages to be erased—after erasure there will be more pages available for writing. Data fragmentation is a common issue associated with a flash memory device. Fragmentation is typically caused by random writes to different pages throughout the flash memory device. Fragmentation is also increased as a result of writes to a highly utilized flash memory device, since writes to nearby logical addresses may end up in relatively disparate physical addresses on the flash memory device.

Both wear leveling and garbage collection operations involve remapping data to different physical storage locations of the flash memory device. The remapping involves identifying active pages on the flash memory device and moving data in such pages from one block to another block. However, in some cases, it is possible that some of the pages that the flash memory device considers to be active may actually be considered invalid (or unwanted) data by upper-level layers (hardware and/or software layers above the flash memory device). However, conventionally, there is no efficient mechanism to provide an indication of which such pages are considered to be invalid (or garbage).

In accordance with some embodiments, to allow an upper-level layer to inform a flash memory device that a particular portion of the flash memory device contains invalid data (or garbage), the upper-level layer writes data according to a predetermined pattern to the particular portion. In some example implementations, this predetermined pattern is all zeros. In other example implementations, other predetermined patterns can be used, so long as such predetermined patterns are not patterns that would normally be used by the upper-level layer for storing data. Using a predetermined pattern of all zeros is beneficial since flash memory devices (as well as upper-level layers) typically already perform zero filling as part of an initialization process or as a step for freeing up space.

Techniques according to some embodiments thus provide efficient mechanisms for informing a flash memory device of invalid data portions. In this manner, layers of a storage stack associated with the flash memory device would not have to be modified to support a standardized protocol that supports commands for specifying pages that are invalid.

Examples of layers of the storage stack associated with a flash memory device include a storage controller of the flash memory device, a flash translation layer for translating between the logical address space of a host electronic device and the physical address space of the flash memory device, a file system, and an operating system (and associated storage device driver). Upper-level layers that can issue requests to the flash memory device include the file system, operating system, and software application(s).

FIG. 1 is a block diagram of an example arrangement of an electronic device 100 that includes a flash memory device 102, such as a flash memory device used in a solid state drive. In alternative implementations, instead of including the flash memory device 102 inside the electronic device 100, the flash memory device 102 can be an external device connected to the electronic device 100 through a port (e.g., Universal Serial Bus port or other type of port), or over a link (wired or wireless). Examples of the electronic device 100 include computers, personal digital assistants (PDAs), telephones, game appliances, and so forth.

In other embodiments, other types of storage devices different from the flash memory device 102 can be used.

The flash memory device 102 includes a memory array 104, which can be made up of one or more semiconductor dies (or chips). In embodiments in which a different type of storage device is used, storage media different from the memory array 104 of the flash memory device 102 would be used. A memory controller 106 is connected to the memory array 104, where the memory controller 106 is configured to receive read, write, or erase requests from upper-level layers of the electronic device 100. In response, the memory controller 106 sends corresponding commands to the memory array 104 to perform the requested read, write, or erase operations. The memory controller 106 includes a processor 108 and other components (not shown). The processor 108 performs programmed tasks according to firmware and/or software (which can be stored in memory on the processor 108 or external to the processor 108).

The memory controller 106 is further connected to a memory 110, which can be implemented with a random access memory (RAM) such as a dynamic random access memory (DRAM) or static random access memory (SRAM), in some examples. In some implementations these memories may be made nonvolatile by use of a capacitor or battery and by being backed by flash memory (possibly part of array 104) for long-term persistence. The memory controller 106 is also connected to host interface logic 112 to allow the flash memory device 102 to communicate with upper-level layers of the electronic device 100, which includes a file system 114, an operating system 116 (which includes one or more storage drivers 118), and software application(s) 120. The file system 114, operating system 116, and software application(s) 120 are executable on one or more processors 122 of the electronic device 100. The processor(s) 122 is (are) connected to storage media 124, which can include a random access memory or disk-based storage media. Note also that the storage media 124 can be implemented with the flash memory device 102.

Each software application 120 of the electronic device 100 is capable of issuing read or write requests to the flash memory device 102 for reading or writing data. The read or write requests are received by the operating system 116 and file system 114, which convert the read or write requests into corresponding requests to be submitted to the flash memory device 102.

In accordance with some embodiments, one or more of the software application(s) 120, operating system 116 (and corresponding storage driver 118), and file system 114 are configured to write a predetermined pattern to a logical block to indicate to the flash memory device that the logical block is considered to be invalid data by the upper-level layer (software application 120, operating system 116, or file system 114).

Different implementations employ different mappings between logical blocks and physical blocks or pages of the flash memory device 102. A logical block may be larger than or smaller than a physical block of the flash memory device 102. Alternatively, a logical block may be larger than or smaller than a page of the flash memory device 102. The specific mapping between logical blocks and physical storage locations of the flash memory device 102 depends on the specific implementation.

The memory controller 106 maintains a logical address-to-physical location mapping data structure 130, to map logical block addresses to physical storage locations. A logical block addresses used by an upper-level layer, such as the application software 120, operating system 116, or file system 114, for accessing a corresponding logical block.

The flash memory device 102 (and more specifically the host interface logic 112 in cooperation with the memory controller 106) presents a logical block-based interface to the upper-level layers of the electronic device 100. Such a logical block-based interface can be similar to a block-based interface provided by disk-based storage devices.

In accordance with some embodiments, a validity tracking data structure is provided to keep track of logical blocks/physical locations associated with the predetermined pattern (which indicates that the corresponding logical block/physical location is invalid). For example, the validity tracking data structure can be in the form of an array 132 of bits (or other indicators) associated with corresponding logical address-to-physical location mapping entries of the mapping data structure 130. When the memory controller 106 detects that a write request received through the host interface logic 112 specifies a write of the predetermined pattern, then the corresponding bit of the array 132 is set to indicate that the corresponding logical block/physical location is invalid, and cleared to indicate that it is valid otherwise. The "physical location" can be a physical block, page, or other collection of storage bits of the flash memory device 102. The physical pages will also be marked as being available to be erased.

In alternative embodiments, instead of maintaining the array of bits 132 (associated with the mapping data structure 130) for indicating valid/invalid logical block/physical pages, a separate data structure can be used to track the valid/invalid logical blocks/physical locations. As yet another alternative, instead of using the array of bits 132 to indicate invalid or valid logical blocks, the mapping data structure 130 can provide the indications. For logical blocks that contain invalid data, the mapping data structure 130 can map such logical blocks to clearly invalid physical locations (e.g., pages). In such an embodiment, the "indicator" for an invalid logical block is in the form of an invalid physical location identifier.

When a read request is received by the memory controller 106, the memory controller 106 checks if the corresponding bit in the array 132 is set. If the bit indicates that the logical block is pointing to an invalid location, the read returns the predetermined pattern. Otherwise, the controller 106 performs the mapping lookup to the corresponding physical location and returns the bits stored there (e.g. a "normal" flash read).

FIG. 1 further depicts a free block list 134 that is maintained in the memory 110 (or alternatively, in the memory array 104) of the flash memory device 102 for keeping track of free blocks in the memory array 104. These free blocks can be written to for future write operations. In addition, the memory 110 can contain a physical pages tracking structure 136 that tracks which physical pages contain invalid data to be erased, which physical pages contain valid data that have corresponding logical pages that map to the corresponding physical pages containing valid data, and which physical pages are erased and available to be written to. Note that the physical pages tracking structure 136 is distinct from the array 132 that indicates which logical blocks contain invalid data.

Figure 2:
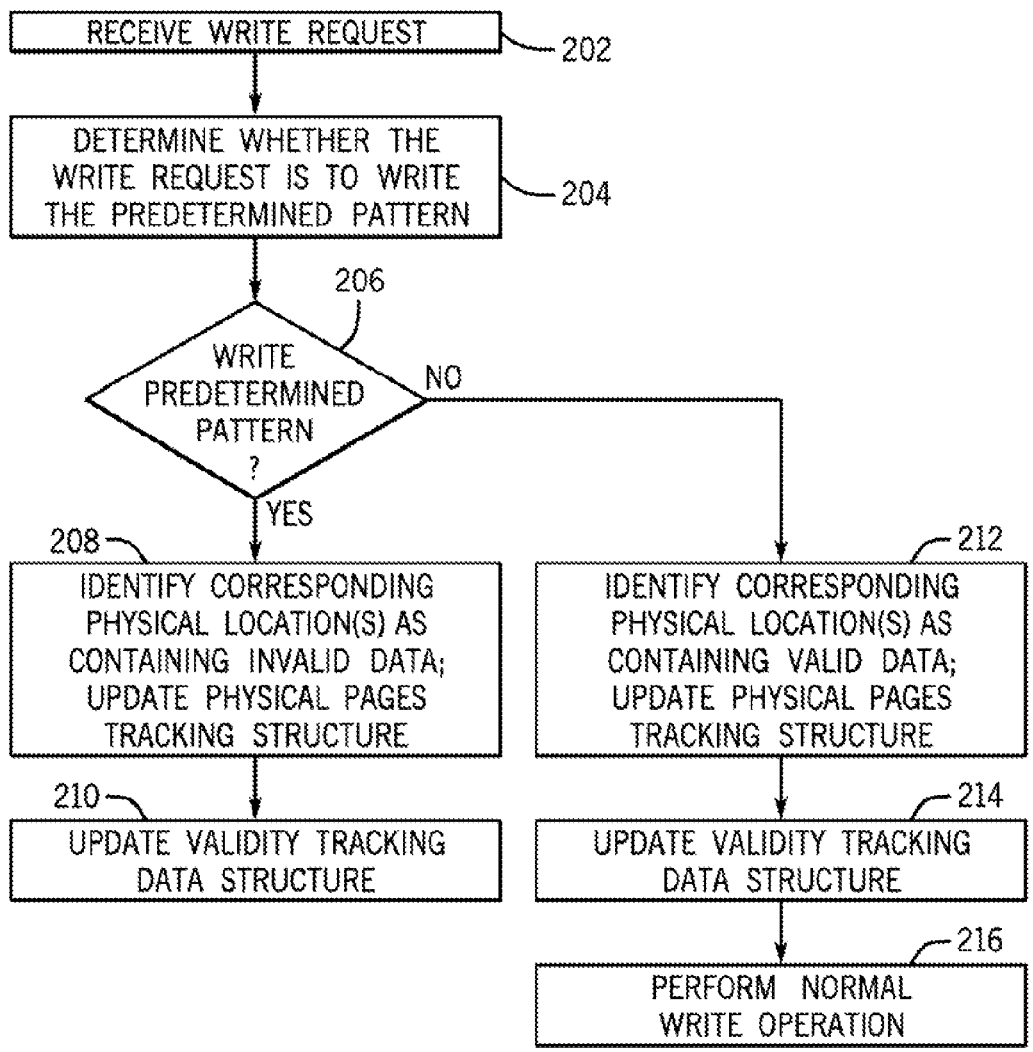
FIG. 2 is a flow diagram of a process of identifying invalid data portions, according to some embodiments.

FIG. 2 is a flow diagram of a process of identifying locations of the flash memory device 102 considered by an upper-level layer to be invalid. The process of FIG. 2 can be performed by control logic, which can be the memory controller 106 of FIG. 1, or other logic components (which can be hardware or a combination of software (or firmware) and hardware). A write request is received (at 202) by the flash memory device 102 from an upper-level layer (such as the file system 114 of the electronic device 100 of FIG. 1). The memory controller 106 determines (at 204) whether the received write request is a request to write the predetermined pattern (e.g., all zeros).

If the write request is a request to write the predetermined pattern, then the logical block address-to-physical location mapping data structure 130 (FIG. 1) is accessed to identify (at 208) which physical location(s) (e.g., pages, physical blocks, etc.) of the memory array 104 is (are) associated with the logical block that is the subject of the write of the predetermined pattern. Note that the write contains a logical block address. In 208, the physical pages tracking structure 136 (FIG. 1) is updated to indicate the physical pages affected by the write of the predetermined pattern as containing invalid data.

One or more entries of the validity tracking data structure (e.g., array 132 of FIG. 1) corresponding to the identified physical location(s) are then updated (at 210) to indicate that these physical location(s) is (are) associated with invalid data. The validity tracking of the logical addresses are also updated to indicate that these logical address are invalid.

If the write request does not specify a write of the predetermined pattern, as determined at 206, then the corresponding physical location(s) of the memory array 104 is (are) identified (at 212) as containing valid data. In 210, the physical pages tracking structure 136 (FIG. 1) is updated to indicate the physical pages affected by the write of the predetermined pattern as containing valid data. The validity tracking data structure is updated (at 214) accordingly to indicate that the identified physical location(s) contain valid data. The validity tracking of the logical addresses is updated (if appropriate) to indicate that the logical addresses are valid. In addition, a normal write operation is performed (at 216).

Note that when a write request specifies a write of the predetermined pattern, the write does not actually occur to the memory array 104—rather, the corresponding physical location(s) are marked as invalid.

FIG. 4 is a flow diagram of a process of performing a read from the flash memory device when some logical blocks are invalid because of a previous write of the predetermined pattern. In response to receiving (at 402) a read request, the memory controller 106 determines (at 404) from the array 132 whether the logical block is valid. If the logical block is determined to contain valid data, then the memory controller 106 performs (at 406) a normal read operation. If the logical block is determined not to be valid, then the memory controller 106 returns (at 408) the predetermined pattern in response to the read request.

By using techniques according to some embodiments, any upper-level layer can easily and efficiently identify portions of the flash memory device 102 as containing invalid data, without assistance from higher or lower layers. An upper-level layer can thus mark data portions as invalid without too much reconfiguration of the various layers involved.

As discussed above, data remapping is performed in a flash memory device for the purpose of wear leveling and/or garbage collection. In data remapping, data in a page of a source block in the flash memory device is moved to a target block in the flash memory device, such that the source block can be erased and/or used for another purpose.

The data remapping that is performed in a flash memory device is similar to segment cleaning performed in a log-structured file system. In a log-structured file system, all data modifications are written sequentially in a log-like manner. Log-structured file systems were originally developed for disk-based storage devices, but it has been found that log-structured file systems can also be applied to flash memory devices. A log of the log-structured file system is divided into segments, and a segment cleaner in a log-structured file system is used to move data (especially fragmented data) from source segments to target segments, similar to garbage collection performed with respect to blocks of the flash memory device discussed above.

When perform data remapping for either wear leveling or garbage collection, it would be inefficient to move data considered by an upper-level layer to be invalid from one block to another block in the flash memory device. As discussed above, to allow for efficient notification of invalid data, an upper-level layer is able to perform a write of a predetermined pattern, which is recognized by the flash memory device 102 as indicating that the corresponding data portion is invalid.

In accordance with a further embodiment, as depicted in FIG. 3, it is assumed that an event triggering data remapping has occurred (the event may be a trigger to perform wear leveling or a trigger to perform garbage collection). The procedure (which may be performed by the memory controller 106 or other control logic) identifies (at 302) a physical block in the flash memory device 102 for which data remapping is to be performed. Next, the procedure determines (at 304) valid pages in the identified physical block, where the determining includes accessing the validity tracking data structure (e.g., array 132 in FIG. 1) to determine which pages do not contain valid data.

Any invalid data, including invalid data indicated by the validity tracking data structure is disregarded (at 306) in performing the data remapping. Valid data is moved (at 308) from the identified physical block to a target physical block to complete the data remapping.

Instructions of software or firmware described above (including the software application(s) 120, operating system 116, file system 114, and firmware/software associated with the memory controller 106 of FIG. 1) are loaded for execution on a processor (such as processor 108 or 122 in FIG. 1). Processors can include integrated circuit devices, microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   storage media; and
   control logic coupled to the storage media, wherein the control logic is configured to:
      receive a write request specifying a write to a logical address;
      determine whether the write request specifies writing a predetermined pattern;
      in response to determining that the write request specifies writing the predetermined pattern, change an indicator from a first value to a second value, the indicator having the first value indicating that a physical location on the storage media corresponding to the logical address contains valid data, and the indicator having the second value indicating that the physical location corresponding to the logical address contains invalid data, the changed indicator being part of a first data structure mapping physical locations on the storage media to respective indicators for indicating whether the corresponding physical locations contain valid or invalid data.

2. The system of claim 1, wherein the control logic is configured to further:
   in response to determining that the write request specifies writing the predetermined pattern, change an indicator in a second data structure to a value indicating that a logical block associated with the logical address contains invalid data, wherein the second data structure associates logical addresses with respective indicators of whether corresponding logical blocks contain valid or invalid data.

3. The system of claim 2, wherein the control logic is configured to further:
   receive a read request specifying a logical address;
   determine based on the indicators in the second data structure whether a logical block associated with the logical address of the read request contains invalid data; and
   in response to determining that the logical block associated with the logical address of the read request contains invalid data, return the predetermined pattern.

4. The system of claim 1, wherein the control logic is configured to further use the indicators in the first data structure to perform remapping of data in first physical locations on the storage media to second physical locations on the storage media.

5. The system of claim 4, wherein the control logic is configured to perform the remapping of data as part of performing one or both of wear leveling and garbage collection.

6. The system of claim 4, wherein the control logic is configured to perform the remapping by:
   in response to a first of the indicators in the first data structure indicating that a first of the physical locations contains valid data, moving valid data of the first physical location from a first block to a second block, and
   in response to a second of the indicators in the first data structure indicating that a second of the physical locations contains invalid data, disregarding the second physical location in the remapping.

7. The system of claim 1, further comprising a non-volatile memory device, wherein the storage media is in the non-volatile memory device.

8. The system of claim 7, wherein the control logic is in the non-volatile memory device, the non-volatile memory device further comprising:
a memory to store the first data structure and a mapping data structure to map logical addresses to physical locations of the storage media, the logical addresses corresponding to respective logical blocks, wherein a given one of the logical blocks includes a plurality of physical locations on the storage media.

9. The system of claim 8, wherein the physical locations mapped by the first data structure are physical pages on the storage media.

10. The system of claim 1, wherein the control logic is configured to further:
in response to determining that the write does not specify a write of the predetermined pattern, perform a normal write operation by writing data of the write request to the storage media.

11. The system of claim 1, wherein the control logic is configured to:
perform successive write operations sequentially to locations of the storage media in a log-like manner; and
remap data in at least a first one of the locations to another location of the storage media to free up the first location, wherein the remapping is based on accessing the first data structure.

12. The system of claim 1, wherein the predetermined pattern is all zeros.

13. The system of claim 1, wherein the control logic is configured to, after changing the indicator from the first value to the second value:
receive a second write request specifying a write to the logical address;
determine whether the second write request specifies writing the predetermined pattern; and
in response to determining that the second write request does not specify writing the predetermined pattern, change the indicator from the second value to the first value in the first data structure, for indicating that the physical location of the storage media corresponding to the logical address contains valid data.

14. A method useable with a storage device having storage media, comprising:
receive a write request received by control logic associated with the storage device, wherein the write request is received from an upper-level layer and specifies a write to a logical address;
determine whether the write request specifies a write of a predetermined pattern;
in response to determining that the write request specifies the write of the predetermined pattern, change an indicator from a first value to a second value, the indicator having the first value indicating that a physical location on the storage media corresponding to the logical address contains valid data, and the indicator having the second value indicating that the physical location corresponding to the logical address contains invalid data, the changed indicator being part of a first data structure mapping physical locations on the storage media to respective indicators for indicating whether the corresponding physical locations contain valid or invalid data; and
in response to determining that the write request does not specify the write of the predetermined pattern, set the indicator to the first value to indicate that the physical location corresponding to the logical address contains valid data.

15. The method of claim 14, further comprising:
in response to determining that the write request specifies writing the predetermined pattern, changing an indicator in a second data structure to a value indicating that a logical block associated with the logical address contains invalid data, wherein the second data structure associates logical addresses with respective indicators of whether corresponding logical blocks contain valid or invalid data.

16. The method of claim 15, comprising:
receiving a read request specifying a logical address;
determining based on the indicators in the second data structure whether a logical block associated with the logical address of the read request contains invalid data; and
in response to determining that the logical block associated with the logical address of the read request contains invalid data, returning the predetermined pattern.

17. The method of claim 14, further comprising:
accessing a mapping data structure to map the logical address of the write request to corresponding one or more physical locations on the storage media.

18. The method of claim 14 further comprising:
performing one of wear leveling and garbage collection in the storage device using the first data structure.

19. The method of claim 18, wherein performing the one of the wear leveling and garbage collection comprises:
in response to a first of the indicators in the first data structure indicating that a first of the physical locations contains valid data, moving the valid data of the first physical location from a first block to a second block, and
in response to a second of the indicators in the first data structure indicating that a second of the physical locations contains invalid data, disregarding the second physical location in the one of the wear leveling and garbage collection.

20. An article comprising at least one non-transitory computer-readable storage media storing instructions that upon execution cause a storage device to:
receive a write request specifying a write to a logical address;
determine whether the write request specifies writing a predetermined pattern; and
in response to determining that the write request specifies writing the predetermined pattern, change an indicator from a first value to a second value, the indicator having the first value indicating that a physical location on a storage media corresponding to the logical address contains valid data, and the indicator having the second value indicating that the physical location corresponding to the logical address contains invalid data, the changed indicator being part of a first data structure mapping physical locations on the storage media to respective indicators for indicating whether the corresponding physical locations contain valid or invalid data.

* * * * *